(12) United States Patent
Engle et al.

(10) Patent No.: US 10,830,536 B2
(45) Date of Patent: Nov. 10, 2020

(54) ROLLER TRANSPORT ASSEMBLY FOR TRANSPORTING ROLLERS TO AND FROM A ROLLER HEARTH FURNACE

(71) Applicant: Ford Motor Company, Dearborn, MI (US)

(72) Inventors: James Engle, Chesterfield, MI (US); Frank Bishop, Wales, MI (US); Elizabeth Bullard, Royal Oak, MI (US); Thomas Kendall, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 184 days.

(21) Appl. No.: 15/921,841

(22) Filed: Mar. 15, 2018

(65) Prior Publication Data

US 2019/0285345 A1 Sep. 19, 2019

(51) Int. Cl.
*F27B 9/30* (2006.01)
*F27B 9/24* (2006.01)
*F27D 3/02* (2006.01)
*C21D 9/00* (2006.01)

(52) U.S. Cl.
CPC .............. *F27B 9/30* (2013.01); *F27B 9/2407* (2013.01); *F27D 3/026* (2013.01); *C21D 9/0012* (2013.01)

(58) Field of Classification Search
CPC .. F27B 9/24; F27B 9/2407; F27B 9/30; F27D 3/026; B65G 13/06; B65G 13/11; C21D 9/0012; H01L 21/67733

USPC .................................. 414/591, 265; 105/404
See application file for complete search history.

(56) References Cited

U.S. PATENT DOCUMENTS

| 1,395,749 | A | * | 11/1921 | Thorn | ..................... B66C 13/00 |
| | | | | | 212/299 |
| 2,714,967 | A | * | 8/1955 | Olsen | ..................... B61D 47/00 |
| | | | | | 414/340 |
| 5,032,054 | A | * | 7/1991 | Krajicek | ............... B23P 19/024 |
| | | | | | 29/726.5 |
| 5,800,161 | A | * | 9/1998 | Drigani | ................ C21D 9/0012 |
| | | | | | 432/121 |
| 2014/0165404 | A1 | | 6/2014 | Ebner et al. | |
| 2016/0208858 | A1 | * | 7/2016 | Balster | .................... C03B 35/16 |
| 2016/0208861 | A1 | * | 7/2016 | Balster | .................. F16C 35/062 |

FOREIGN PATENT DOCUMENTS

| EP | 0033845 | 8/1981 |
| EP | 0101931 | 3/1984 |
| JP | 2002285246 | 10/2002 |
| KR | 20100117353 | 11/2010 |

* cited by examiner

*Primary Examiner* — Glenn F Myers
(74) *Attorney, Agent, or Firm* — Burris Law, PLLC

(57) ABSTRACT

A roller transport assembly includes a cart assembly and a roller carriage assembly. The roller carriage assembly is slidably mounted to the cart assembly and has at least one chamber for housing a roller. Each of the chambers includes a linear rail extending along a first axis and a roller coupling device attached to and slidable along the linear rail. The roller coupling device is operable to couple to the roller and move the roller along the first axis adjacent and parallel with the linear rail.

17 Claims, 6 Drawing Sheets

ROLLER TRANSPORT ASSEMBLY FOR TRANSPORTING ROLLERS TO AND FROM A ROLLER HEARTH FURNACE

FIELD

The present disclosure relates to transferring rollers to and from a roller hearth furnace.

BACKGROUND

The statements in this section merely provide background information related to the present disclosure and may not constitute prior art.

A roller hearth furnace includes multiple rollers (e.g., ceramic rollers) that are arranged side-by-side along the length of the furnace, and operable to rotate and move a component through the furnace. The roller hearth furnace, which may also be referred to as a hearth oven, can reach temperatures of approximately 930° C. (1706° F.).

At times, the rollers undergo a maintenance procedure in which an old roller within the furnace is exchanged with a new roller. Such maintenance procedures may be performed when the furnace is at high temperatures, which can be a challenge due to the hot temperatures of the rollers. In one removal method, one operator pushes one end of the roller from one side of the furnace, and two to three other operators cradle and pull the roller from the other side of the furnace. In this method, the hot roller is unguarded as it is removed from the furnace, and has the potential of falling onto the ground. These and other issues are addressed by the present disclosure.

SUMMARY

This section provides a general summary of the disclosure, and is not a comprehensive disclosure of its full scope or all of its features.

In one form, the present disclosure is directed toward a roller transport assembly that includes a cart assembly and a roller carriage assembly that is slidably mounted to the cart assembly. The roller carriage assembly has at least one chamber to hold a roller, and each of the at least one chambers includes a linear rail extending along a first axis and a roller coupling device attached to and slidable along the linear rail. The roller coupling device is operable to couple to the roller and move the roller along the first axis adjacent and parallel with the linear rail.

In another form, the cart assembly includes a body and a plurality of wheels attached to the body. The plurality of wheels includes at least one pair of rail wheels operable to move along a rail extending along a second axis transverse the first axis.

In yet another form, the cart assembly further includes a carriage support mechanism having a pair of linear bearings that are arranged on opposite sides of the cart assembly. The roller carriage assembly is mounted on the carriage support mechanism and is slidable along the first axis by way of the carriage support mechanism.

In one form, the roller transport assembly further includes a height adjustment mechanism disposed on the cart assembly and operable to adjust a height of the cart assembly.

In another form, the roller transport assembly further includes at least one heat shield positioned at and extending along one or more of the at least one chambers.

In yet another form, the roller carriage assembly includes four of the chambers.

In one form, the roller carriage assembly further includes a frame, and the linear rail of each of the at least one chamber is arranged and connected to the frame.

In another form, the roller transport assembly further includes one or more roller guides disposed at each of the at least one chamber and attached to the frame adjacent to the linear rail.

In yet another form, the roller coupling device includes a roller holder and a handle member connected to the roller holder. The roller holder includes an engagement head operable to engage with an inner diameter of the roller, and the handle member is attached to the linear rail and is operable to move along the linear rail.

In one form, the present disclosure is directed towards, a roller transport assembly that includes a cart assembly and a roller carriage assembly. The cart assembly includes a body and a carriage support mechanism mounted on the body. The carriage support mechanism is operable to slide along a first axis. The roller carriage assembly is mounted on the carriage support mechanism, and includes a frame and a plurality of chambers. Each of the plurality of chambers includes a linear rail and a roller coupling device. The linear rail is attached to the frame and extends along the first axis, and the roller coupling device is attached to the linear rail and is operable to slide along the linear rail.

In another form, the cart assembly includes a plurality of wheels attached to the body, and the plurality of wheels includes at least one pair of rail wheels operable to move along a rail extending along a second axis transverse the first axis.

In yet another form, the carriage support mechanism includes a pair of linear bearings that are arranged on opposite sides of the cart assembly.

In one form, the roller coupling device includes a roller holder and a handle member connected to the roller holder. The handle member is attached to the linear rail and is operable to move the roller holder along the first axis adjacent and parallel with the linear rail.

In another form, the roller transport assembly further includes at least one heat shield positioned at and extending along one or more of the plurality of chambers. Each of the at least one heat shield is pivotably attached to the frame of the roller carriage assembly.

In yet another form, the roller transport assembly of claim 10 further includes one or more roller guides disposed at each of the plurality of chambers and attached to the frame adjacent to the linear rail.

In one form, the present disclosure is directed toward a hearth furnace roller transport assembly that includes a cart assembly and a roller carriage assembly slidably mounted to the cart assembly. The roller carriage assembly includes multiple chambers, and each of the chambers includes a linear rail extending along a first axis and a roller coupling device slidable along and adjacent to the linear rail. The roller coupling device includes a roller holder operable to couple to and decouple from a roller.

In another form, the cart assembly further includes a pair of linear bearings arranged on opposite sides of the cart assembly along the first axis, and the roller carriage assembly is mounted on the linear bearing.

In yet another form, the hearth furnace roller transport assembly further includes one or more roller guides disposed at each of the chambers and attached to the roller carriage assembly adjacent to the linear rail.

In one form, the hearth furnace roller transport assembly further includes at least one heat shield positioned at and extending along one or more of the multiple chambers. Each of the at least one heat shield is pivotably attached to the roller carriage assembly.

In another form, the cart assembly includes a plurality of wheels, and the plurality of wheels includes at least one pair of rail wheels operable to move along a rail extending along a second axis transverse the first axis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
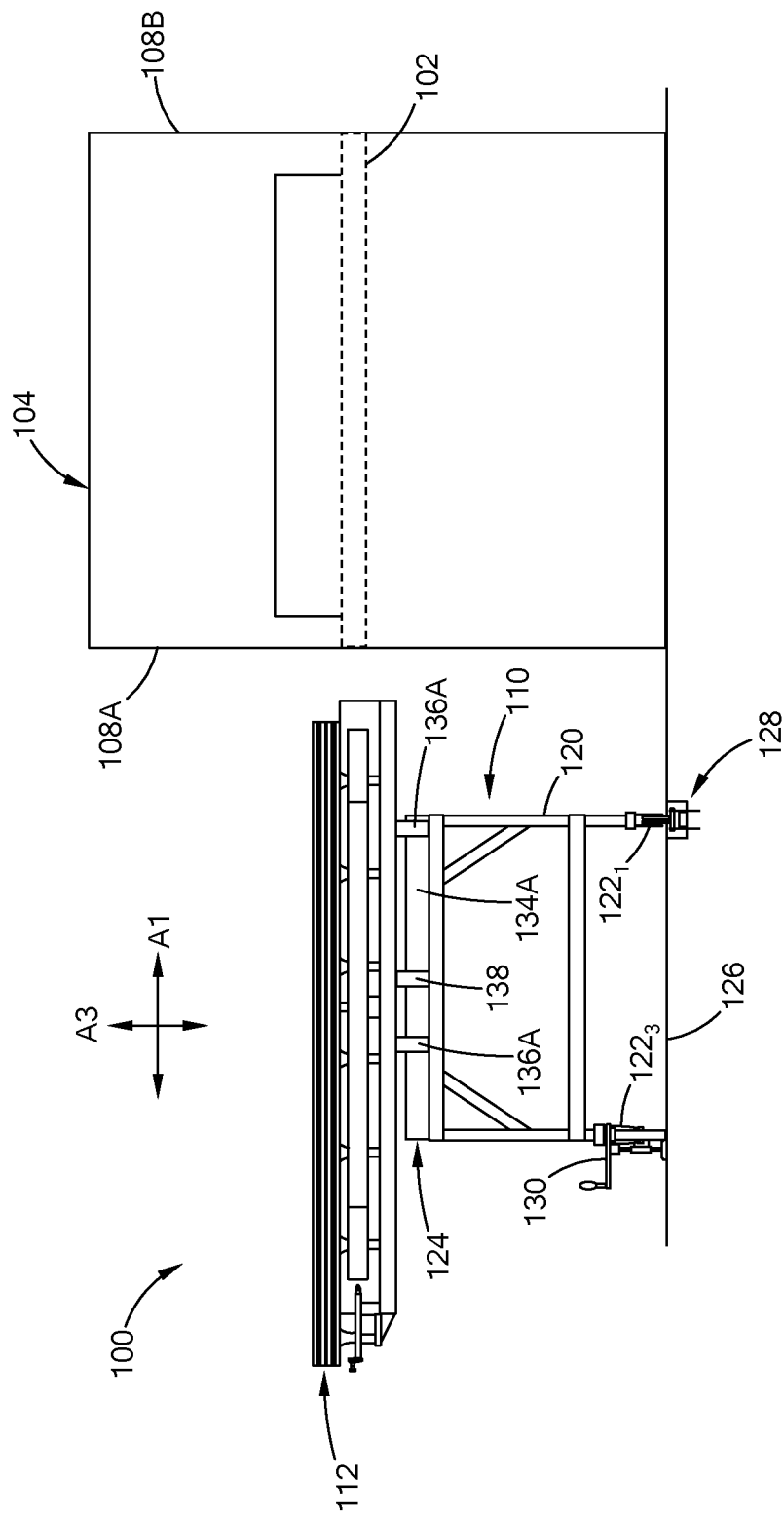
FIG. 1 is a side view of a roller transport assembly in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed towards a roller transport assembly that is configured to transport a roller to and from a roller hearth furnace. As described herein, the roller transport assembly includes a rail guided cart that includes multiple chambers for supporting the rollers. These and other features of the roller transport assembly will now be described with reference to the drawings.

Figure 2A:
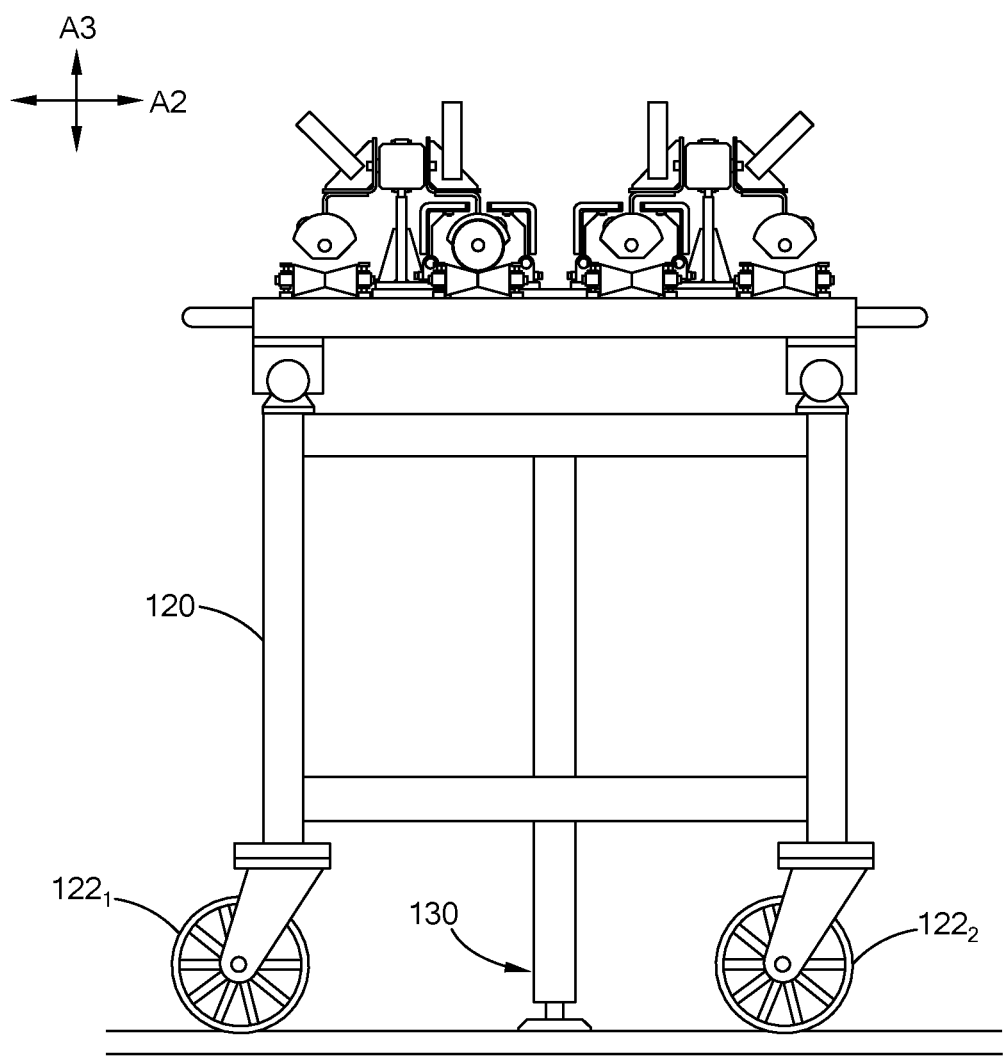
FIGS. 2A and 2B is a front view of the roller transport assembly of FIG. 1.
Figure 2B:
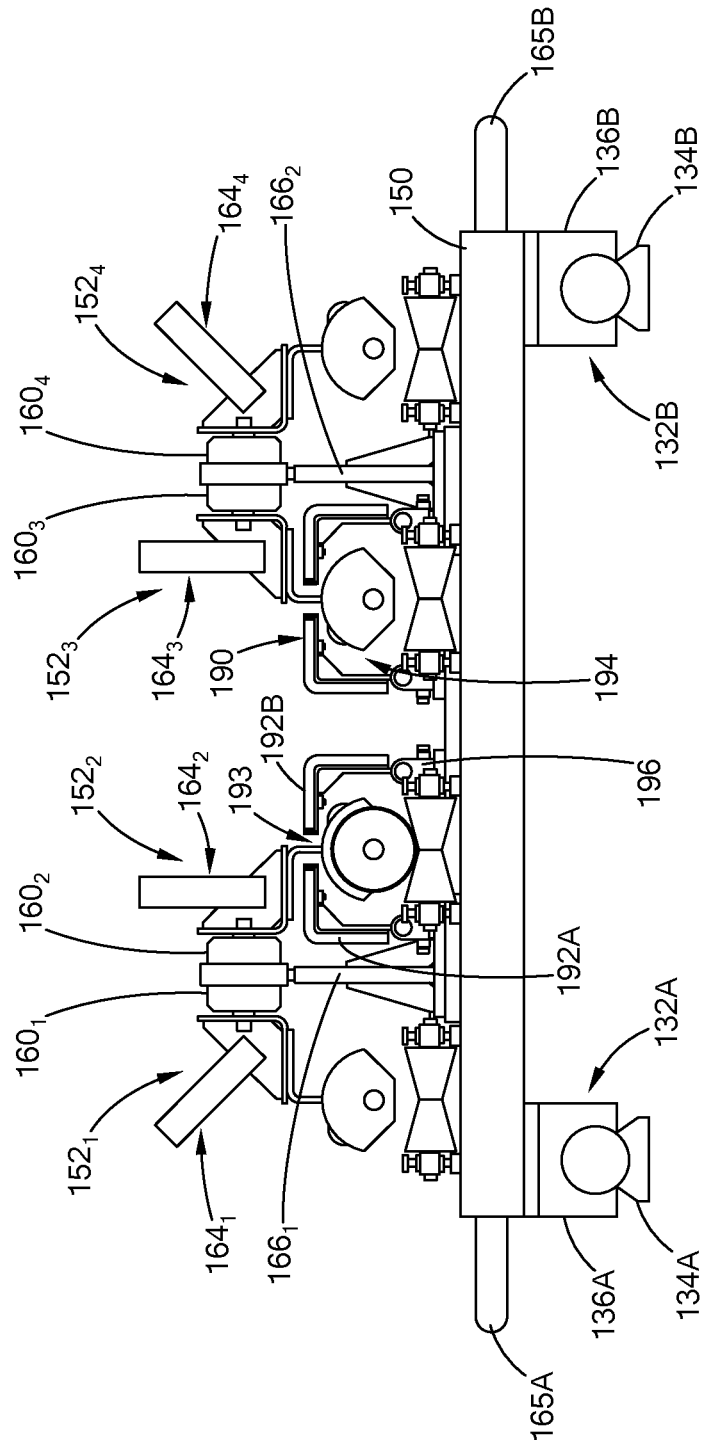

Referring to FIGS. 1, 2A, and 2B, a roller transport assembly 100 of the present disclosure is operable to transfer one or more rollers 102 to and from a hearth furnace 104. The furnace 104 holds each roller 102 in a designated compartment that is accessible along sides 108A and 108B of the furnace 104.

In the following, the transport assembly 100 may be described in reference to three orthogonal axes. For example, FIGS. 1 and 2A illustrate a first axis A1, a second axis A2, and a third axis A3.

In one form, the transport assembly 100 includes is a cart assembly 110 and a roller carriage assembly 112 slidably mounted to the cart assembly 110. The cart assembly 110 is configured to support and align the roller carriage assembly 112 relative to the furnace 104, and the roller carriage assembly 112 is configured to engage with a roller and slidingly move the roller to/from the furnace along the first axis.

The cart assembly 110 includes a body 120, multiple wheels 122 ($122_1$, $122_2$, $122_3$ in figures) attached to the body 120, a carriage support mechanism 124, and a height adjustment mechanism 130 mounted on the body 120. In one form, the cart assembly 110 includes four wheels 122 (only $122_1$, $122_2$, and $122_3$ are illustrated in figures) that move the transport assembly 100 along a floor 126. At least one pair of wheels are provided as rail wheels. More particularly, to align the transport assembly 100 along the longitudinal side of the furnace 104 (e.g., second axis), the cart assembly 110 includes two rail wheels ($122_1$ and $122_2$ in FIG. 2A) that are moveable along a rail 128 that extends parallel to the length of the furnace 104. Accordingly, with the rail wheels $122_1$ and $122_2$ positioned within the rail 128, the cart assembly 110 is positioned transverse to the longitudinal side of the furnace 104 to access the rollers. The cart assembly 110 is also positioned a set distance away from the furnace 104, which is controlled by the location of the rail 128 relative to the furnace 104.

In one form, the cart assembly 110 includes the height adjustment mechanism 130 to control the height of the cart assembly 110 in a direction along the third axis. In one form, the height adjustment mechanism 130 is a hydraulic pump device, a manually mechanical device with a rotatable armature configured to increase/decrease the height of the body, and/or other suitable mechanism.

The carriage support mechanism 124 is operable to move the position of the roller carriage assembly 112 along the first axis. In one form, the carriage support mechanism 124 includes a pair of linear bearings 132A and 132B that are arranged on opposite sides of the cart assembly 110 and are collectively referred to as linear bearings 132. Each of the linear bearings 132 include a guide rail 134 (134A and 134B in figures) and at least one bearing 136 (136A and 136B in figures) that slide along the guide rail 134. The guide rails 134 are attached to the body 120 and the roller carriage assembly 112 is attached to the bearings 136. Accordingly, the roller carriage assembly 112 is slidable along the first axis to align with a compartment having a roller.

The carriage support mechanism 124 further includes a brake device 138 operable to control the movement of the roller carriage assembly 112. Specifically, the brake device 138 is operable in an engaged state to prevent the roller carriage assembly 112 for moving along the linear bearing or a disengaged state to allow movement of the assembly 112. The brake device 138 may be provided as a clamp for controlling position of a linear bearing, a pin insert lock, and/or other suitable lock for controlling movement of the roller carriage assembly 112.

Figure 3:
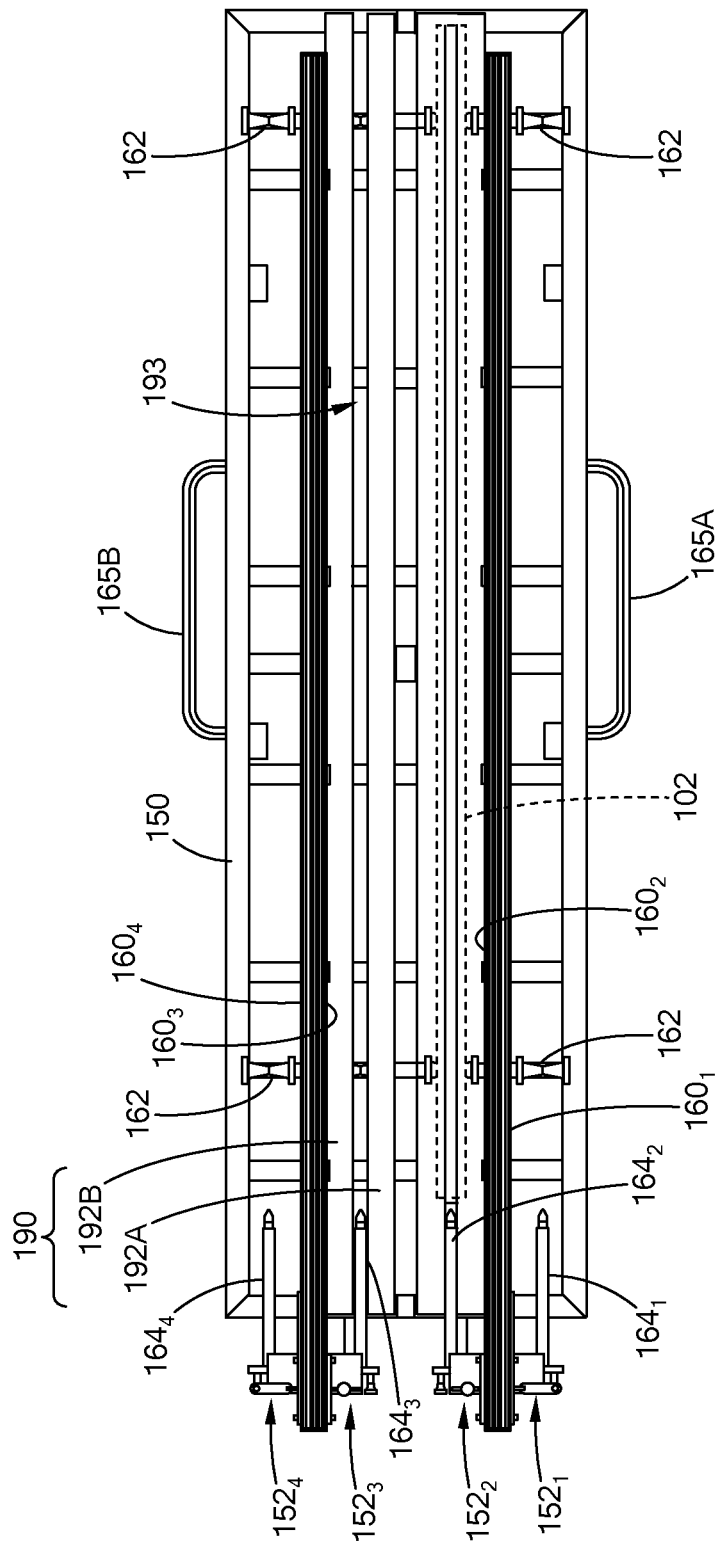
FIG. 3 is a top view of the roller transport assembly of FIG. 1.

Referring to FIGS. 2-3, the roller carriage assembly 112 has one or more chambers for housing one or more rollers. More particularly, in one form, the assembly 112 includes a frame 150 and four chambers $152_1$ to $152_4$ supported by the frame 150. The chambers $152_1$ to $152_4$ are collectively referred to as chambers 152. In one form, each chamber 152 is configured to include a linear rail 160 ($160_1$ to $160_4$ in figures), one or more roller guides 162, and a roller coupling device 164 ($164_1$ to $164_4$ in figures). While four chambers are illustrated, the roller carriage assembly can be configured to include less than or more than four chambers.

The frame 150 is attached to the linear bearings 132A and 132B of the carriage support mechanism 124. In one form, the frame 150 includes a pair of handle bars 165A and 165B provided on either side of the frame 150 to slide the frame 150 and thus, the roller carriage assembly 112 along the first axis (FIG. 3). The roller guides 162 are distributed at each chamber 152 and connected to the frame 150 to provide support for the roller.

The linear rails 160 extend along the first axis, and are mounted on the frame 150. In one form, the linear rails 160 are arranged in pairs such that the linear rails 160 in a pair are face opposite directions. For example, linear rail $160_1$ and $160_2$ form a first pair and the linear rails $160_3$ and $160_4$ form a second pair. The linear rails $160_1$ and $160_2$ are attached to the frame 150 via a first support member $166_1$, such that the rails $160_1$ and $160_2$ are arranged on opposite sides of the first support member $166_1$. In a similar manner, the linear rails $160_3$ and $160_4$ are attached to the frame 150 via a second support member $166_2$. In one form, each of the first and second support members $166_1$ and $166_2$ include at least two brackets or posts that are configured to elevate the linear rails 160 above the frame 150 and align the linear rails 160 along the first axis. In another form. each linear rail 160 may be attached to the frame 150 by a separate support member, and may not share a support member with another linear rail 160.

Figure 4:
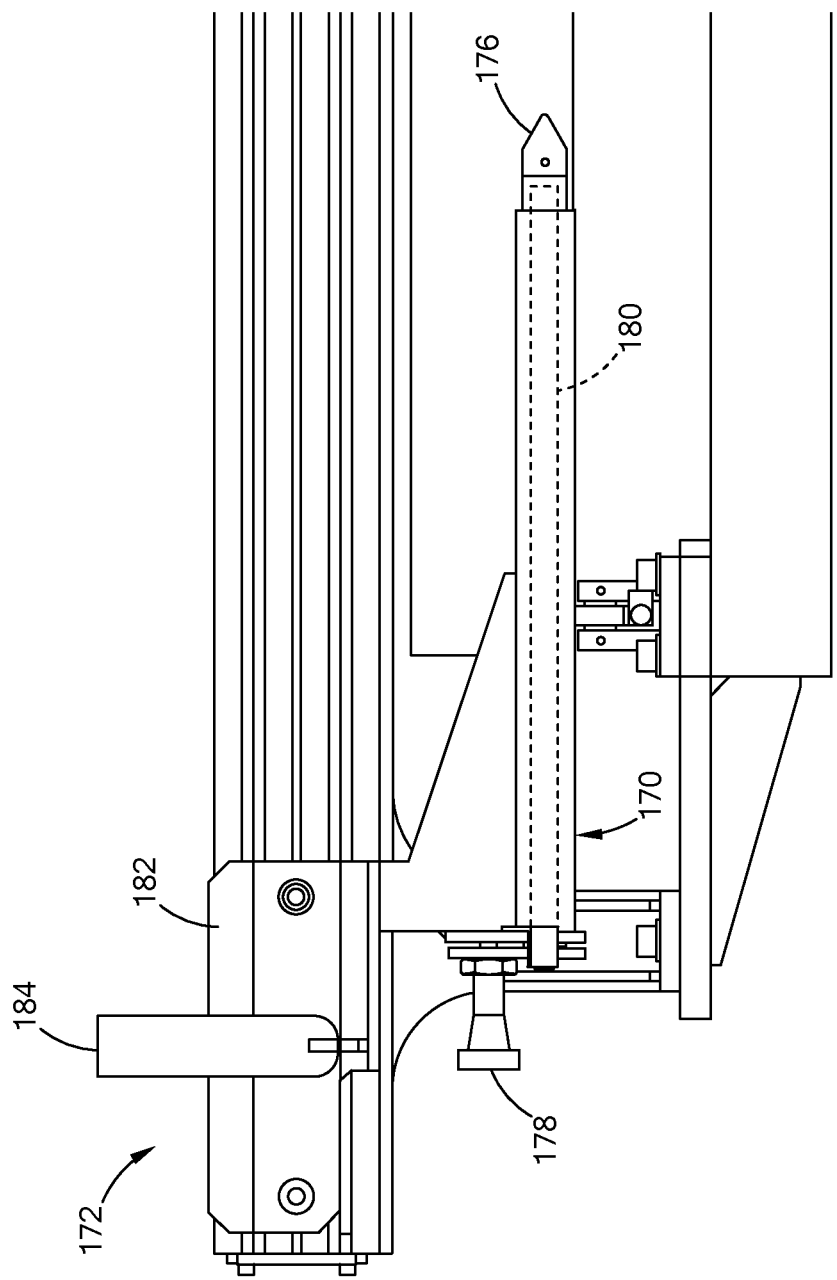
FIG. 4 is a side view of a roller coupling device of the roller transport assembly in accordance with the teachings of the present disclosure.

Each linear rail 160 includes the roller coupling device 164, which is attached to the linear rail 160 and is operable to slide along the linear rail 160. More particularly, referring to FIGS. 4 and 5, each linear rail 160 includes one or more ribs 169 extending longitudinally along the rail 160 to slidably hold the roller coupling device (see FIG. 5).

Figure 5:
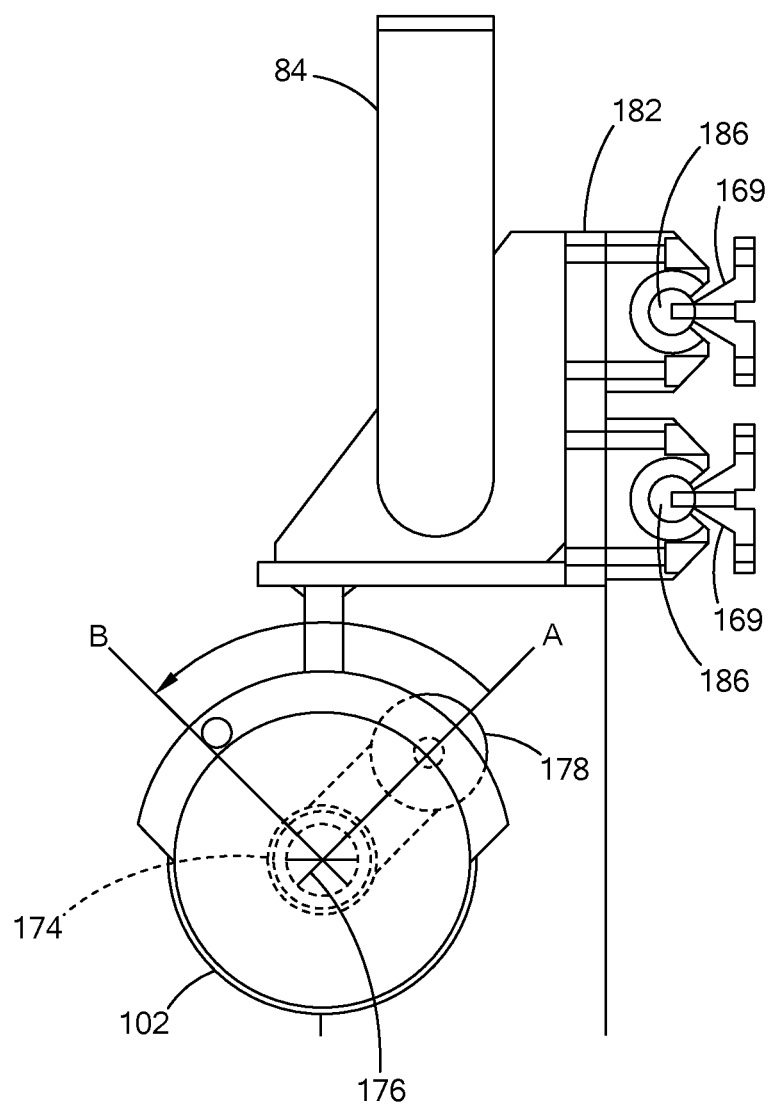
FIG. 5 is a front view of the roller coupling device of FIG. 4.

The roller coupling device 164 includes a roller holder 170 to engage and disengage with the roller, and a handle member 172 to move the roller holder 170 along the linear rail 160. The roller holder 170 includes an arm 174, an engagement head 176 protruding from the end of the arm 174, and a lock 178. In one form, the engagement head 176 has a hexagon shape to engage with an end of the roller. The lock 178 is connected to the engagement head 176 by way of a rod 180, and is operable to place the engagement head 176 in a lock position or in an unlock position. More particularly, in one form, the rod 180 is fixedly attached to the lock 178 and the engagement head 176, and extends through the arm 174. The lock 178 is rotatable in the clockwise and counter clockwise directions (e.g., rotates 90 degrees), and when rotated, the engagement head 176 also rotates by way of the rod 180. For example, FIG. 5 illustrates the roller coupling device 164 when viewed from the head 176. A dashed-dot-dashed circle represent an end of the roller 102, and the head 176 is substantially concentric with a center of the roller 102. In this example, the lock 178 is set at position A to have the engagement head 176 in the lock position, and set at position B to have the engagement head 176 in the unlock position. Here, position A and B are separated by approximately a 90-degrees rotation of the lock 178.

In the lock position, the engagement head 176 forms an interference fit with an inner diameter of the roller to hold or grip the roller. In the unlock position, the engagement head 176 forms a lose fit with the inner diameter to release the roller. The roller holder 170 may be configured in other suitable ways to engage and disengage with the roller. For example, the holder 170 may not include an arm but just the rod extending between the lock and the engagement head. Also, the engagement head 146 may be another shape and should not be limited to a hexagon shape.

The handle member 172 extends from the roller holder 170, and is configured such that the roller holder 170 is provided adjacent to the linear rail 160. The handle member 172 includes a rail bracket 182 that interfaces with the linear rail 160, and a handle 184 that extends from the rail bracket 182. In one form, the rail bracket 182 include one or more grooves 186 that engage with one or more ribs 169 of the linear rail 160. The rail bracket 182 is configured to slide along the linear rail 160 in response to a force applied to the handle 184 by a user. More particularly, the user may exert a push or pull force on the handle 184 to move the rail bracket 182, and thus, the roller holder 170 along the linear rail 160.

Referring to FIGS. 2-3, in one form, one or more chambers 152 of the roller carriage assembly 112 includes a heat shield 190 that extends longitudinal along the roller carriage assembly 112 to form a barrier between the roller 102 and the surrounding environment. Specifically, at times, a roller is removed from the furnace 104 when the furnace 104 is in operation and thus, the roller may be at a high temperature (e.g., 1700 degrees Fahrenheit). The heat shield 190 forms a barrier between the hot roller and, for the example, an operator. In the figures, the heat shield 190 is provided at the chambers $152_2$ and $152_3$. The heat shield 190 may be provided at any of the chambers 152, and while two of the chambers are shown as having the heat shield 190, one or more of the chambers 152 may include the heat shield 190.

In one form, the heat shield 190 includes a pair of shield members 192A and 192B that are opposed to each other, and attached to the frame 150. The pair of shield members 192A and 192B define a gap 193 therebetween to accommodate the roller coupling device 164 that extends between the shield members 192A and 192B, such that the roller holder 170 is positioned in cavity 194 formed by the 192A and 192B. The shield members 192A and 192B are pivotably mounted to the frame 150 via one or more hinges 196 to allow the operator to gain access to the cavity 194, which is configured to house the roller. The heat shield 190 may include a single pair of shield members 192A and 192B that are configured to extend longitudinally along the roller carriage assembly 112. Alternatively, the heat shield 190 may include multiple pairs of shield members 192A and 192B that are arranged along the longitudinally axis of the roller carriage assembly to form the cavity 194. In one form, each of the shield member 192A and 192B may be made of a rigid material (e.g., metal) that is filed with insulation. Other suitable materials may be used.

An example operation of the roller transport assembly is now provided. In one form, the roller transport assembly 100 is mounted with one or more new rollers to replace one or more rollers from the furnace. For example, if two rollers are to be replaced, two new rollers are mounted at two of the chambers 152, such that each roller is supported by the roller guides 162, extends longitudinally along the roller carriage assembly 112, and is disposed adjacent to the linear rail 160 of the chamber 152. In one form, the roller transport assembly 100 may be moved to a holding area having the rollers to acquire the new rollers. Alternatively, the new rollers may be moved to the area having the furnace 104 and the roller transport assembly 100.

With the new rollers mounted and the rail wheels $122_1$ and $122_2$ aligned in the rail 128, the roller transport assembly 100 is moved along the second axis to the compartment that has one of the rollers to be replaced (i.e., "old roller" hereinafter). More particularly, if chambers $152_1$ and $152_4$ have the new rollers, chambers $152_2$ and $152_3$ are empty to receive the old rollers. Accordingly, one of the empty chambers 152 of the roller carriage assembly 112 is aligned with the compartment of the old roller.

To gain access to the ends of the roller, an operator may need to remove a panel provided outside the compartment along sides 108A and 108B of the furnace 104. In addition, if the height of the roller carriage assembly 112 is not aligned with the opening of the compartment, the height of the roller transport assembly 100 is adjusted by way of the height adjustment mechanism 130.

With the brake device 138 of the carriage support mechanism 124 disengaged, the roller carriage assembly 112 is slidingly moved in front of the opening of the compartment by way of the carriage support mechanism 124. Once aligned, the brake device 138 is set to the engaged position to prevent the carriage support mechanism 124 from moving.

The roller coupling device 164 of the empty chamber 152 is moved to one end of the roller, and the engagement head 176 is positioned within the end of the roller and set in the lock position by way of the lock 178. In one form, a first operator is positioned at side 108A to operate the roller coupling device 164 and a second operator is at side 108B at the other end of the roller. In cooperation, the first operator slides the roller coupling device along the linear rail 160 away from the furnace 104 to pull the old roller out while the second operator uses a tool to push the old roller out or the furnace 104. The old roller slides onto the roller carriage assembly 112, and is supported by the roller guides 162. In the example provided, the old roller is positioned in one of chambers $152_2$ and $152_3$, which include the heat shield 190 to form a barrier around the old roller.

To install the new roller, the chamber 152 having the new roller is aligned in front of the compartment opening. In one form, a ring may be positioned at the opening of the compartment to protect a coating provide on the surface of the new roller. The roller coupling device 164 attached to the new roller is then pushed along the linear rail 160 to push the new roller in the compartment. Once positioned, the engagement head 176 is unlocked to release the roller coupling device 164 from the roller. The process to remove the old roller and install the new roller can be repeated again for the remaining rollers. It should be readily understood that the example operation above is just one method for exchanging rollers using the roller transport assembly of the present disclosure, and other suitable steps may be used.

The roller transport assembly of the present disclosure is configured to facilitate alignment of the roller as the roller is being removed from or installed in the furnace, and thus inhibits damage to the walls of the furnace or even the roller. In addition, by housing the rollers, the roller transport assembly secures the position of the rollers to prevent breakage and provide an unobstructed environment about the furnace. These and other features are provided by the roller transport assembly of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A roller transport assembly comprising:
a cart assembly; and
a roller carriage assembly slidably mounted to the cart assembly, the roller carriage assembly including a frame and having at least one chamber to hold a roller, wherein the at least one chamber includes a linear rail extending along a first axis and a roller coupling device attached to and slidable along the linear rail, and the roller coupling device is operable to couple to the roller and move the roller along the first axis adjacent and parallel with the linear rail and below the linear rail, and the linear rail of each of the at least one chamber is arranged and connected to the frame.

2. The roller transport assembly of claim 1, wherein the cart assembly includes a body and a plurality of wheels attached to the body, the plurality of wheels includes at least one pair of rail wheels operable to move along a rail extending along a second axis transverse the first axis.

3. The roller transport assembly of claim 1, wherein the cart assembly further includes a carriage support mechanism having a pair of linear bearings that are arranged on opposite sides of the cart assembly, and the roller carriage assembly is mounted on the carriage support mechanism and is slidable along the first axis by way of the carriage support mechanism.

4. The roller transport assembly of claim 1 further comprising a height adjustment mechanism disposed on the cart assembly and operable to adjust a height of the cart assembly.

5. The roller transport assembly of claim 1 further comprising at least one heat shield positioned at and extending along one or more of the at least one chamber.

6. The roller transport assembly of claim 1, wherein the roller carriage assembly includes four of the chambers.

7. The roller transport assembly of claim 1 further comprising one or more roller guides disposed at each of the at least one chamber and attached to the frame adjacent to the linear rail.

8. The roller transport assembly of claim 1, wherein the roller coupling device includes a roller holder and a handle member connected to the roller holder, the roller holder includes an engagement head operable to engage with an inner diameter of the roller, and the handle member is attached to the linear rail and is operable to move along the linear rail.

9. A roller transport assembly comprising:
a cart assembly comprising a body and a carriage support mechanism mounted on the body, wherein the carriage support mechanism is operable to slide along a first axis; and
a roller carriage assembly mounted on the carriage support mechanism, and including a frame and a plurality of chambers, wherein each of the plurality of chambers includes a linear rail and a roller coupling device, the linear rail is attached to the frame and extends along the first axis, and the roller coupling device is attached to the linear rail and is operable to slide along the linear rail, wherein the roller coupling device includes a roller holder and a handle member connected to the roller holder, the handle member is attached to the linear rail and is operable to move the roller holder along the first axis adjacent and parallel with the linear rail.

10. The roller transport assembly of claim 9, wherein the cart assembly includes a plurality of wheels attached to the body, the plurality of wheels includes at least one pair of rail wheels operable to move along a rail extending along a second axis transverse the first axis.

11. The roller transport assembly of claim 9, wherein the carriage support mechanism includes a pair of linear bearings that are arranged on opposite sides of the cart assembly.

12. The roller transport assembly of claim 9 further comprising at least one heat shield positioned at and extending along one or more of the plurality of chambers, wherein each of the at least one heat shield is pivotably attached to the frame of the roller carriage assembly.

13. The roller transport assembly of claim 9 further comprising one or more roller guides disposed at each of the plurality of chambers and attached to the frame adjacent to the linear rail.

14. A hearth furnace roller transport assembly comprising:
   a cart assembly;
   a roller carriage assembly slidably mounted to the cart assembly, the carriage assembly having multiple chambers, wherein each of the chambers includes a linear rail extending along a first axis and a roller coupling device slidable along and adjacent to the linear rail, and the roller coupling device includes a roller holder operable to couple to and decouple from a roller; and
   at least one heat shield positioned at and extending along one or more of the multiple chambers, wherein each of the at least one heat shield is pivotably attached to the roller carriage assembly.

15. The hearth furnace roller transport assembly of claim 14, wherein the cart assembly further includes a pair of linear bearings arranged on opposite sides of the cart assembly along the first axis, and the roller carriage assembly is mounted on the pair of linear bearings.

16. The hearth furnace roller transport assembly of claim 14 further comprising one or more roller guides disposed at each of the chambers and attached to the roller carriage assembly adjacent to the linear rail.

17. The hearth furnace roller transport assembly of claim 14, wherein the cart assembly includes a plurality of wheels, and the plurality of wheels includes at least one pair of rail wheels operable to move along a rail extending along a second axis transverse the first axis.

* * * * *